United States Patent
Zapata

(10) Patent No.: US 9,705,405 B2
(45) Date of Patent: Jul. 11, 2017

(54) POWER CONVERTERS AND METHODS FOR REDUCING VOLTAGE CHANGES AT AN OUTPUT OF A POWER CONVERTER

(71) Applicant: Astec International Limited, Kwun Tong, Kowloon (HK)

(72) Inventor: Jian Carlo Decena Zapata, Santo Tomas (PH)

(73) Assignee: ASTEC INTERNATIONAL LIMITED, Kwun Tong, Kowloon (HK)

(*) Notice: Subject to any disclaimer, the term of this patent is extended or adjusted under 35 U.S.C. 154(b) by 38 days.

(21) Appl. No.: 14/752,213

(22) Filed: Jun. 26, 2015

(65) Prior Publication Data

US 2016/0380544 A1    Dec. 29, 2016

(51) Int. Cl.
*H02M 3/335* (2006.01)
*H02M 1/32* (2007.01)

(52) U.S. Cl.
CPC ......... *H02M 3/33507* (2013.01); *H02M 1/32* (2013.01); *H02M 3/33592* (2013.01)

(58) Field of Classification Search
CPC ............. H02M 3/335; H02M 3/33507; H02M 3/33523; H02M 3/33592; H02M 1/32; H02M 1/36; H02M 2001/0032; Y02B 70/1433; Y02B 70/1441; Y02B 70/1475

USPC .......................................... 323/21.01–21.18
See application file for complete search history.

(56) References Cited

U.S. PATENT DOCUMENTS

| 7,843,179 | B2 | 11/2010 | Hasegawa et al. | |
|---|---|---|---|---|
| 9,035,637 | B1* | 5/2015 | Abu Qahouq | H02M 3/157 323/283 |
| 2011/0205764 | A1 | 8/2011 | Sheng et al. | |
| 2016/0233768 | A1* | 8/2016 | de Cremoux | H02M 3/157 |

* cited by examiner

*Primary Examiner* — Yemane Mehari
(74) *Attorney, Agent, or Firm* — Harness, Dickey & Pierce, P.L.C.

(57) ABSTRACT

Example switching power converters and methods for reducing voltage changes at an output of a power converter are generally disclosed. According to one aspect, a switching power converter includes an input, an output for providing an output voltage, at least one switch capable of causing a voltage overshoot of the output voltage when the switch is turned on, and a controller. The controller is configured to sense the output voltage, compare the sensed output voltage to a voltage reference, and adjust operation of the power converter based on the comparison of the sensed output voltage and the voltage reference to maintain the output voltage. The controller is further configured to decrease the voltage reference from a normal operation value to an overshoot reduction value before turning on the switch to decrease the output voltage and reduce an overshoot of the output voltage in response to turning on the switch.

20 Claims, 4 Drawing Sheets

POWER CONVERTERS AND METHODS FOR REDUCING VOLTAGE CHANGES AT AN OUTPUT OF A POWER CONVERTER

FIELD

The present disclosure relates to power converters and methods for reducing voltage changes at an output of a power converter.

BACKGROUND

This section provides background information related to the present disclosure which is not necessarily prior art.

Many switched-mode power supplies have a tight output voltage regulation, especially on transient response or dynamic loadings of a system. Designers may implement a very high voltage feedback closed-loop gain to contain the transient voltage responses of the output within allowable limits.

With increasing efficiency requirements of power supplies, synchronous rectification is being widely used to increase efficiency of power supplies. During light load applications, synchronous rectification may be disabled to avoid reverse currents, for burst modes on circuits that utilize cross regulation, and to increase efficiency especially on LLC converters when operating frequency is higher.

Once synchronous rectifiers are enabled, their voltage drop may abruptly change from a body diode drop to almost zero, which may introduce a voltage overshoot at an output terminal of the power supply that exceeds an allowable limit.

SUMMARY

This section provides a general summary of the disclosure, and is not a comprehensive disclosure of its full scope or all of its features.

According to one aspect of the present disclosure, a switching power converter generally includes an input for receiving an input voltage from a power source, an output for providing an output voltage to a load, at least one switch capable of causing a voltage overshoot of the output voltage when the switch is turned on, and a controller coupled to the at least one switch. The controller is configured to sense the output voltage, compare the sensed output voltage to a voltage reference, and adjust operation of the power converter based on the comparison of the sensed output voltage and the voltage reference to maintain the output voltage at a target value. The controller is further configured to decrease the voltage reference from a normal operation value to an overshoot reduction value before turning on the switch to decrease the output voltage and reduce an overshoot of the output voltage in response to turning on the switch.

According to another aspect of the present disclosure, a switching power converter generally includes an input for receiving an input voltage from a power source, an output for providing an output voltage to a load, at least one switch capable of causing a voltage overshoot of the output voltage when the switch is turned on, and a controller coupled to the at least one switch. The controller is configured to sense the output voltage, compare the sensed output voltage to a voltage reference, and adjust operation of the power converter based on the comparison of the sensed output voltage and the voltage reference to maintain the output voltage at a target value. The controller is further configured to temporarily change the voltage reference prior to triggering an expected overshoot or an expected undershoot of the output voltage to prevent the expected undershoot or overshoot from exceeding a specified overshoot threshold or a specified undershoot threshold.

According to another aspect of the present disclosure, a method of controlling a switching power converter is disclosed. The power converter includes an input for receiving an input voltage from a power source, an output for providing an output voltage to a load, and a controller for controlling the output voltage of the power converter. The method includes sensing the output voltage of the power converter, comparing the sensed output voltage to a voltage reference, maintaining the output voltage at a target value based on the comparison of the sensed output voltage and the voltage reference, and changing the voltage reference prior to triggering an expected overshoot or an expected undershoot of the output voltage to prevent the expected undershoot or overshoot from exceeding a specified overshoot threshold or a specified undershoot threshold.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
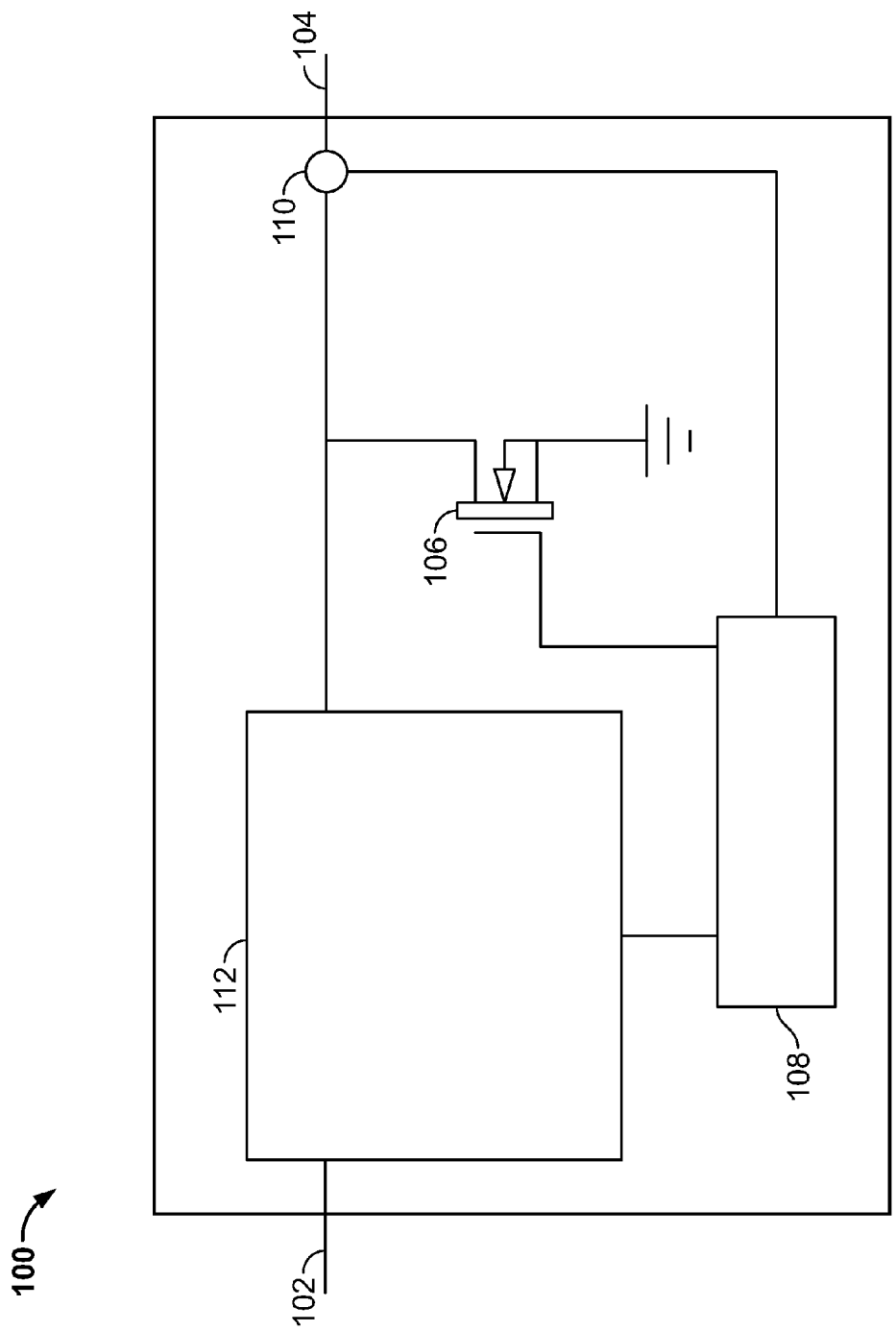
FIG. 1 is a block diagram of an example switching power converter for reducing voltage changes at an output of the power converter, according to an aspect of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A switching power converter according to one example embodiment of the present disclosure is illustrated in FIG. 1 and indicated generally by reference number 100. As shown in FIG. 1, the switching power converter 100 includes an input 102 for receiving an input voltage from a power source and an output 104 for providing an output voltage to a load. The power converter 100 also includes at least one switch 106 configured to cause a voltage overshoot of the output voltage when the switch is turned on. The converter 100 further includes a controller 108 coupled to the switch 106.

The controller 108 is configured to sense the output voltage, compare the sensed output voltage to a voltage reference, and adjust operation of the power converter based on the comparison of the sensed output voltage and the voltage reference to maintain the output voltage at a target value.

For example, the converter 100 may include an output voltage sensor 110 configured to sense the output voltage at the output 104. The output voltage sensor 110 may be coupled to the controller 108. The output voltage sensor 110 may include any suitable components for sensing the output voltage, including a voltage divider, sense resistor, etc. For example, the voltage sensor 110 may include a voltage divider coupled between the output 104 and ground. The voltage divider may include a midpoint, and the midpoint may be coupled to the controller 108. The controller 108 may be configured to sense the output voltage using the voltage divider.

The power converter 100 may be any suitable power converter, including a switching power converter (e.g., switched-mode power supply (SMPS)), etc. The converter 100 may include a voltage conversion portion 112, which may include any suitable arrangement of components to convert an input voltage to an output voltage. The voltage conversion portion 112 may include one or more resistors, switches, inductors, capacitors, transformers, etc. The components may be arranged in any suitable circuit topology, including an LLC topology, a boost topology, a buck topology, a boost-buck topology, etc. The input voltage and the output voltage of the converter 100 may be the same or different. Although FIG. 1 illustrates the controller 108 and the switch 106 as outside the voltage conversion portion 112, the controller and switch may both be part of the conversion portion 112, one or the other may be part of the conversion portion 112, etc.

The controller 110 may sense the output voltage as feedback to control operation of the voltage conversion portion 112 and/or the switch 106 (which may be part of the voltage conversion portion). For example, the controller 108 may sense the output voltage and make adjustments to operation of voltage conversion portion 112 and/or switch 106 based on a comparison of the sensed output voltage to a voltage reference. The voltage reference may be an internal reference of the controller 108, an external input to the controller, etc. If the output voltage is too high, the controller 108 may adjust operation of the voltage conversion portion 112 and/or switch 106 to reduce the output voltage. If the output voltage is too low, the controller may adjust operation of the voltage conversion portion 112 and/or switch 106 to increase the voltage. If the output voltage is at a desired value, the controller 108 may not adjust operation of the converter 100.

The controller 108 may be any suitable controller for controlling operation of the converter 100, including a microcontroller, microprocessor, control circuit, integrated circuit, digital signal processor, etc. The controller 108 may be configured to operate via any combination of hardware and/or software. For example, the controller 108 may implement an algorithm using any suitable techniques including, storing computer executable instructions in a memory of the controller, implementing logic instructions in the structure of the controller etc.

The controller 108 may be configured to control operation of the converter 100 using any suitable techniques, including adjusting operation of one or more switches of the converter 100. For example, the controller 108 may adjust a duty cycle, switch timing, etc. of one or more switches of the converter 100 to increase, decrease, maintain, etc. the output voltage of the converter. The controller 108 may execute an algorithm that includes sensing the output voltage, comparing the sensed output voltage to a voltage reference, maintaining the output voltage at a target value based on the comparison of the sensed output voltage and the voltage reference, and/or changing the voltage reference prior to turning on the switch to reduce an overshoot of the output voltage.

The switch 106 may be any suitable switch, including a metal-oxide-semiconductor field-effect transistor (MOSFET), a bipolar junction transistor (BJT), etc. The switch 106 may be a synchronous rectifier, and may be configured to provide synchronous rectification in the converter 100. The switch 106 may include a body diode, and there may be a voltage drop across the diode when the switch is turned off.

The switch 106 may cause a voltage overshoot of the output voltage when the switch is turned on. For example, once the switch 106 is turned on, the voltage drop across the switch may change from a body diode drop to near zero, which may introduce a voltage overshoot at the output voltage. This voltage overshoot may exceed allowable limits of the converter 100.

The controller 108 is configured to decrease the voltage reference from a normal operation value to an overshoot reduction value before turning on the switch 106 to decrease the output voltage and reduce an overshoot of the output voltage in response to turning on the switch. For example, decreasing the voltage reference may cause a corresponding reduction in the output voltage because of the feedback loop that compares the sensed output voltage to the voltage reference. If the voltage reference is reduced, the output voltage may be reduced accordingly (e.g., level-shifted) until the new voltage reference is met by the sensed output voltage.

Reducing the voltage reference before turning on the switch 106 may cause the output voltage to decrease such that once the switch is turned on, the resulting overshoot of the output voltage is also reduced. This reduced overshoot may not exceed the allowable limit of the converter 100, such that the reduced overshoot is acceptable. Accordingly, the output voltage may be level-shifted so that although the delta of the overshoot voltage change from minimum to maximum is the same, the maximum peak voltage reached by the overshoot is reduced due to the level-shifting.

The voltage reference may have a normal operation value (e.g., 2.5V, etc.) when the converter 100 is operating normally (e.g., while the switch is off, while the switch has been on for a sufficient length of time, etc.) to keep the output voltage at a normal output voltage value (e.g., 12V, etc.). Before turning on the switch 106, the voltage reference may be reduced to an overshoot reduction value, which may cause a corresponding reduction in the output voltage. The voltage reference may be the same as the output voltage, such that a direct comparison is made. The voltage reference may be a fraction of the output voltage (e.g., based on a voltage divider, etc.), such that a voltage value change in the voltage reference causes a different voltage value change in the output voltage. There may be a ratio between the voltage reference and the output voltage, such that changes in the voltage reference cause corresponding changes in the output voltage multiplied by the ratio. The controller 108 may be configured to reduce the voltage reference using any suitable techniques, including changing a setting of an internal voltage reference, adjusting an analog to digital conversion of a sensed voltage reference and/or output voltage, applying a programmed adjustment to a voltage reference and/or output voltage, etc.

Figure 2:
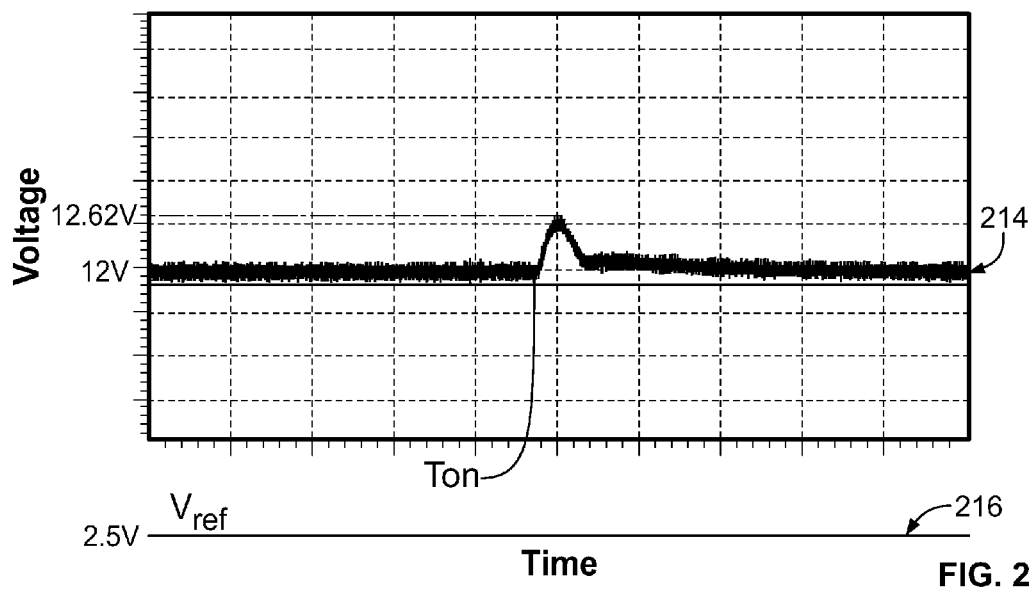
FIG. 2 is a waveform of an example voltage overshoot at an output of the power converter of FIG. 1.

FIG. 2 illustrates an example waveform 214 of the output voltage of the converter 100 when the voltage reference is kept constant at 2.5V during turn on of the switch 106. The voltage reference value 216 is illustrated below the output voltage waveform 214.

As shown in FIG. 2, switch turn on occurs at time Ton. This causes a voltage overshoot in the output voltage 214. The output voltage 214 starts at a value of 12V, then overshoots to a value of 12.62V at switch turn on. This value of 12.62V may exceed an allowable limit of the converter 100. For example, if the target value of the converter 100 is about 12V during normal operation, an overshoot limit may exist that sets limits on how far the voltage can deviate from 12V. Any suitable voltage limits may be used, including not more than 5 percent above the target value (i.e., 105 percent of the target value), not more than 5 percent below the target value (i.e., 95 percent of the target value), no change of more than 10 percent from the target value, etc. In this example, a 5 percent overshoot limit may set a limit of 12.6V for the output voltage. Thus, the 12.62V overshoot of the output voltage 214 exceeds the allowable limits.

Figure 3:
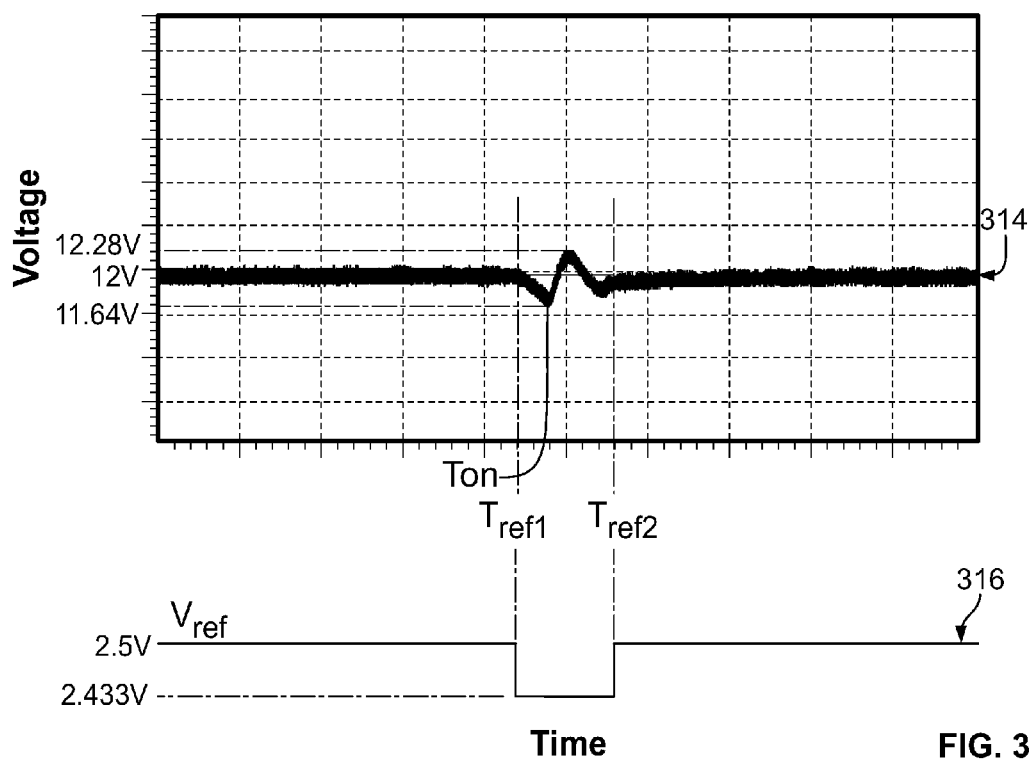
FIG. 3 is a waveform of an example reduced voltage overshoot at the output of the power converter of FIG. 1.

FIG. 3 illustrates another example waveform 314 of the output voltage of the converter 100 when the voltage reference is reduced before switch turn on. FIG. 3 is similar to FIG. 2, but the voltage reference is reduced (as shown by waveform 316) from a normal operation value of 2.5V to an overshoot reduction value of 2.433V at Tref1. This occurs before switch turn on at Ton. Reducing the voltage reference 316 causes the output voltage 314 to reduce to 11.64V before switch turn on. Once the switch 106 is turned on, a voltage overshoot occurs that peaks at 12.28V. After the overshoot ends, the voltage reference is increased back to the normal operation value of 2.5V.

As compared to the voltage overshoot to 12.62V in FIG. 2, the overshoot to only 12.28V in FIG. 3 is within the allowable limits of the converter 100. The overshoot of the output voltage 314 to 12.28V is less than a 5 percent change from the normal operating value of 12V. Thus, the overshoot of the output voltage is reduced by changing the voltage reference prior to switch turn on. This adjustment can prevent the output voltage from exceeding allowable limits.

The example voltage values illustrated in FIGS. 2 and 3 are for purposes of illustration only, and other embodiments may include other voltage values for the voltage reference and output voltage waveforms.

The amount of reduction of the voltage reference prior to turn on of the switch 106 may be determined to provide a desired reduction in the output voltage such that turning on the switch will not cause an overshoot that exceeds allowable limits of the converter 100. For example, the difference between the normal operation value of the voltage reference and the overshoot reduction value of the voltage reference may be based on (e.g., proportional to, etc.) a difference between an overshoot in the output voltage that occurs in response to turning on the switch 106 and a maximum allowable overshoot. In order to determine this difference, an overshoot in the output voltage when the switch is turned on may be measured. This overshoot may be compared to a maximum allowable overshoot (e.g., no more than 5 percent of the target output voltage, etc.) to determine a voltage difference value. Once the voltage difference value is determined, the overshoot reduction value of the voltage reference may be selected such that the output voltage is reduced by the voltage difference value before switch turn on. Then, once the switch 106 is turned on, the overshoot will no longer exceed the maximum allowable overshoot.

The overshoot reduction value may be selected based on a proportion between the normal voltage reference and the output voltage. For example, a 2.5V reference voltage may be used to maintain a 12V output voltage, for a ratio of 5/24. If the output voltage is to be reduced by 0.5V due to a difference between the overshoot voltage and the maximum allowable overshoot, the voltage reference may be decreased by a proportional ratio of 0.5V*5/24.

As an example, an overshoot of the output voltage may be measured at 12.7V, while a maximum allowable overshoot may be only 12.6V, for a difference of 0.1V. If an overshoot reduction value of the voltage reference is selected to cause the output voltage to reduce by 0.1V before switch turn on, a resulting overshoot when the switch is turned on may not exceed this limit. The output voltage may be reduced by more than the measured difference to provide a margin for error of the voltage overshoot. For example, reducing the output voltage by 0.4V in the previous example instead of 0.1V would provide a greater margin of error for the overshoot to keep it from exceeding the allowable limits. These example values are for purposes of illustration only, and other embodiments may use any suitable values.

Alternatively, or in addition, the difference between the normal operation value for the voltage reference and the overshoot reduction value for the voltage reference may be based on (e.g., proportional to, etc.) a difference between a voltage across the switch 106 when the switch is turned off and a voltage across the switch when the switch is turned on. For example, the voltage across the switch 106 when the switch is turned off may be approximately equal to a voltage across the body diode (e.g., body diode drop) of the switch when the switch is turned off. The voltage across the switch 106 when the switch is turned on may be approximately equal to the current through the switch multiplied by the resistance of the switch in saturation while the switch is turned on (which may be near zero). Thus, when the switch is turned on during normal operation, an overshoot may occur at the output that is approximately equal to the difference in the voltage drop across the switch when it is turned on as compared to the voltage drop when it is turned off (e.g., a switch voltage drop change value). If the voltage reduction value of the voltage reference is selected to cause a reduction in the output voltage similar to the switch voltage drop change value, the overshoot of the output voltage when the switch is turned on will not exceed the allowable limits of the converter 100.

As an example, if the voltage drop across the switch when it is turned off is about 0.6V and the voltage drop across the switch when it is turned on is about 0V, turning on the switch may cause an overshoot at the output voltage of about 0.6V. Reducing the voltage reference to cause the output voltage to decrease by 0.6V prior to switch turn on will keep the overshoot at switch turn on from exceeding allowable limits. Ratios of the difference may also be used, which may prevent the converter from exceeding a lower limit on the output voltage. Using the above example, the output voltage may only be decreased by 0.3V instead of 0.6V so that the output voltage does not go below a lower limit, while still reducing the overshoot of the output voltage by 0.3V (as opposed to reducing it by the full 0.6V). These example values are for purposes of illustration only, and other embodiments may use any suitable values.

Alternatively, or in addition, the difference between the normal operation value of the voltage reference and the overshoot reduction value of the voltage reference may be determined by measuring an overshoot of the output voltage in response to turning on the switch during operation of the power converter. A voltage reduction value can be selected to cause the output voltage to be decreased by the measured overshoot value prior to switch turn on, to cause the output voltage to be decreased by a ratio of (e.g., proportional to, etc.) the measured overshoot value prior to switch turn on, etc.

In some embodiments, the difference between the normal operation value and the overshoot reduction value may be based on (e.g., proportional to, etc.) a forward voltage drop of a body diode of the switch 106. For example, at switch turn on the overshoot of the output voltage may be similar to the voltage drop of the body diode of the switch, because this voltage drop may occur while the switch is off and there may be a near zero voltage drop once the switch is turned on. If the forward voltage drop of the body diode is known, the overshoot reduction value of the voltage reference may be selected to cause the output voltage to reduce by the forward voltage drop of the body diode before switch turn on. This may cause a reduction in the amount of voltage overshoot when the switch is turned on. The exact forward voltage drop of the body diode may be used, a ratio of the forward voltage drop of the body diode may be used, etc.

Some example embodiments may calculate an overshoot reduction value for the voltage reference using the following calculation: Vref reduced=Vref/Vout*(Vout−[max overshoot−target overshoot]). Using some example values an overshoot reduction value of 2.433V may be obtained by calculating 2.5V/12V*(12V−[12.62V−12.3V]). These values are for purposes of illustration only and other embodiments may include other values.

The controller 108 may be configured to increase the voltage reference from the overshoot reduction value to the normal operation value after an overshoot of the output voltage, as shown at time Tref2 in FIG. 3. The duration of the reduction in voltage reference (e.g., the time between Tref1 and Tref2 in FIG. 3) may be any suitable duration. The duration may be selected to be longer than the duration of the overshoot transient that occurs at switch turn on. Once the overshoot of the output voltage drops from its peak, the voltage reference may be increased back to its normal operation value (e.g., restored to the normal operation value, returned to the normal operation value, etc.). The duration may be a specified time period after turning on the switch, may be a variable time period, etc.

As an example, a duration between decreasing the voltage reference from a normal operation value to an overshoot reduction value before turning on the switch and increasing the voltage reference from the overshoot reduction value to the normal operation value after turning on the switch may be determined by measuring a duration of an overshoot of the output voltage in response to turning on the switch during operation of the power converter. Once the duration of the overshoot is known, the duration of the voltage reference reduction can be selected such that it is greater than or equal to the duration of the overshoot to provide appropriate reduction of the overshoot during its duration.

Figure 4:
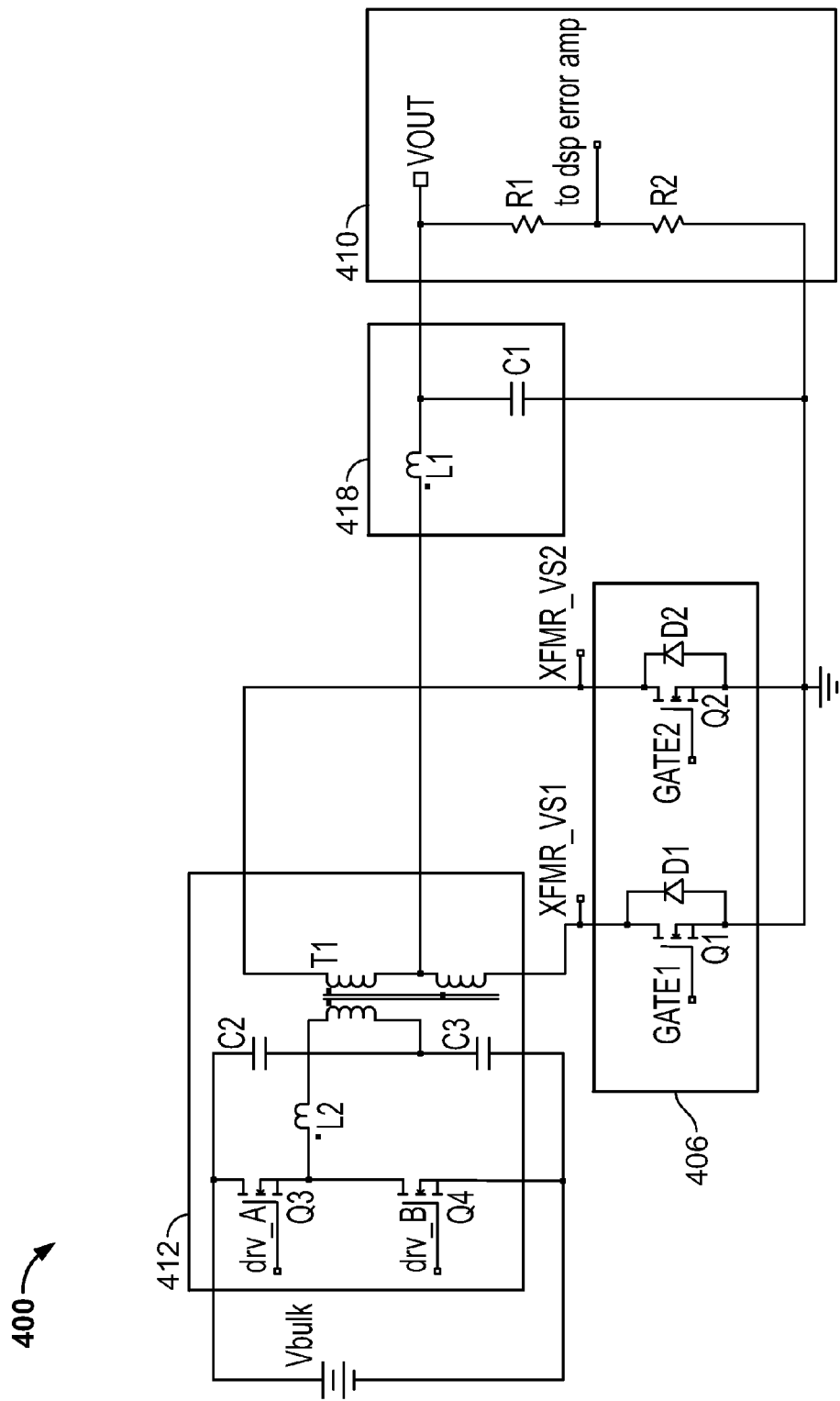
FIG. 4 is a circuit diagram of another example switching power converter for reducing voltage changes at an output of the power converter, according to another aspect of the present disclosure.

FIG. 4 illustrates an example power converter 400 according to another aspect of the present disclosure, which may be similar to power converter 100 of FIG. 1. The converter 400 includes an input Vbulk, an output VOUT, switches 406 (e.g., Q1 and Q2), a controller (not shown), a voltage divider 410 (e.g., resistors R1 and R2), a voltage conversion portion 412 (e.g., switches Q3 and Q4, inductor L2, capacitors C2 and C3, and transformer T1), and an output filter 418 (e.g., inductor L1 and capacitor C1).

Figure 5:
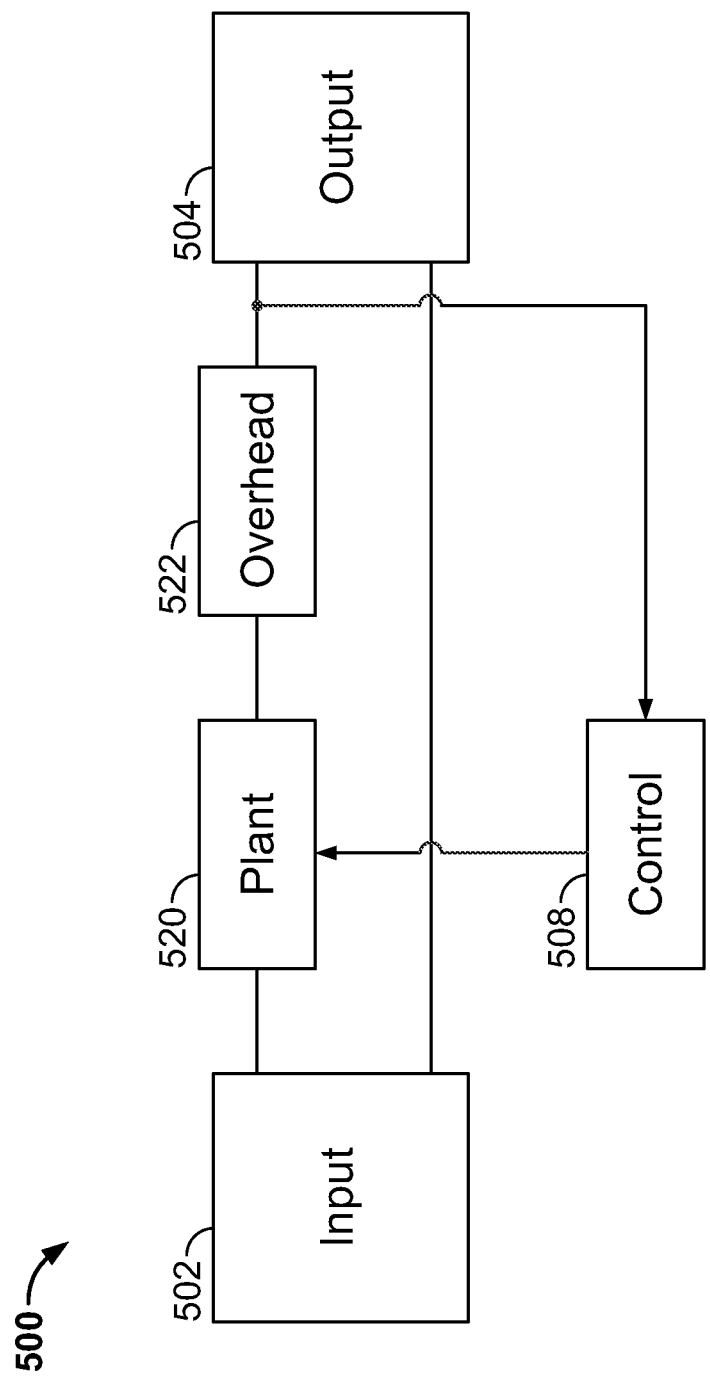
FIG. 5 is a block diagram of an example system for reducing voltage changes at an output of the system, according to another aspect of the present disclosure.

FIG. 5 illustrates an example system 500, including an input 502, an output 504, a control 508, a plant 520, and an overhead 522. The control 508 may be configured to sense a voltage at the output 504 and adjust operation of the plant 520 to cause a voltage at the output 504 to remain at a target value.

The control 508 may be configured to temporarily change a voltage reference prior to triggering an expected overshoot or an expected undershoot of a voltage the output 504, such that triggering the expected undershoot or overshoot will not cause the output voltage to exceed a specified overshoot threshold or a specified undershoot threshold. For example, if the control 508 is going to trigger an event (e.g., turn on a switch, etc.) that will cause an expected undershoot or overshoot of the voltage at the output 504, the control may first change a voltage reference to cause a change in the voltage at the output prior to triggering the event. This may be similar to reducing the voltage reference prior to turning on a switch as described above. Additionally, or alternatively, the voltage reference and/or output voltage could be increased/reduced prior to any event that will trigger an expected overshoot or undershoot of a voltage at the output.

As an example, an opposite change in the voltage reference can be made prior to the event such that the triggered undershoot/overshoot will not exceed allowable limits. The voltage reference may be decreased prior to an expected overshoot of the output voltage. Alternatively, or in addition, the voltage reference may be increased prior to an expected undershoot of the output voltage.

Some example applications may include more than one power supply operated in parallel. A current sharing loop may need to be disabled during synchronous rectifier turn on and reduction of the voltage reference to reduce possible current hunting. In one example approach, the current sharing loop may first be disabled. The voltage reference may be changed to a new value, and then the synchronous rectifiers are turned on. After the overshoot ends, the voltage reference can be returned to normal and the current sharing loop may be enabled.

According to another example embodiment of the present disclosure, a method of reducing voltage changes at an output of a power converter is disclosed. The power converter includes an input for receiving an input voltage from a power source, an output for providing an output voltage to a load, and a controller for controlling the output voltage of the power converter. The method includes sensing the output voltage of the power converter, comparing the sensed output voltage to a voltage reference, maintaining the output voltage at a target value based on the comparison of the sensed output voltage and the voltage reference, and changing the voltage reference prior to triggering an expected overshoot or an expected undershoot of the output voltage to prevent the expected undershoot or overshoot from exceeding a specified overshoot threshold or a specified undershoot threshold. The method may include restoring the voltage reference to an original value of the voltage reference, after the expected overshoot or the expected undershoot of the output voltage.

Changing the voltage reference may include decreasing the voltage reference prior to triggering an expected overshoot of the output voltage. For example, temporarily changing the voltage reference may include decreasing the voltage reference prior to turning on a switch. Alternatively, or in addition, temporarily changing the voltage reference may include increasing the voltage reference prior to triggering an expected undershoot of the output voltage.

Example methods and converters described herein may be used in any suitable converters, including switching power converters, digital power supplies, analog circuits, etc. The voltage reference reductions/increases described herein can be implemented prior to any expected voltage overshoot/undershoot in any suitable converter, system, etc. The voltage reference and/or output voltage changes can occur prior to switch turn on only at startup, at any time the switch is turned on during operation (e.g., repeated every time the switch is turned on during normal operation, etc.).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A switching power converter comprising:
an input for receiving an input voltage from a power source;
an output for providing an output voltage to a load;
at least one switch capable of causing a voltage overshoot of the output voltage when the switch is turned on; and
a controller coupled to the at least one switch, the controller configured to sense the output voltage, compare the sensed output voltage to a voltage reference, and adjust operation of the power converter based on the comparison of the sensed output voltage and the voltage reference to maintain the output voltage at a target value, the controller further configured to decrease the voltage reference from a normal operation value to an overshoot reduction value before turning on the switch to decrease the output voltage and reduce an overshoot of the output voltage in response to turning on the switch.

2. The power converter of claim 1, wherein the controller is configured to increase the voltage reference from the overshoot reduction value to the normal operation value after an overshoot of the output voltage.

3. The power converter of claim 1, further comprising a voltage divider coupled between the output and ground, wherein the controller is configured to sense the output voltage using the voltage divider.

4. The power converter of claim 1, wherein the switch comprises a synchronous rectifier.

5. The power converter of claim 1, wherein the switch comprises a field effect transistor (FET).

6. The power converter of claim 1, wherein the difference between the normal operation value and the overshoot reduction value is proportional to a difference between an overshoot in the output voltage that occurs in response to turning on the switch and a maximum allowable overshoot.

7. The power converter of claim 1, wherein the difference between the normal operation value and the overshoot reduction value is proportional to a difference between a voltage across the switch when the switch is turned off and a voltage across the switch when the switch is turned on.

8. The power converter of claim 7, wherein the voltage across the switch when the switch is turned off is approximately equal to a voltage across the body diode of the switch when the switch is turned off, and wherein the voltage across the switch when the switch is turned on is approximately equal to the current through the switch multiplied by the resistance of the switch in saturation when the switch is turned on.

9. The power converter of claim 1, wherein the difference between the normal operation value and the overshoot reduction value is proportional to an overshoot of the output voltage in response to turning on the switch.

10. The power converter of claim 1, wherein the difference between the normal operation value and the overshoot reduction value is proportional to a forward voltage drop of a body diode of the switch.

11. The power converter of claim 1, wherein a duration between decreasing the voltage reference from the normal operation value to the overshoot reduction value prior to turning on the switch and increasing the voltage reference from the overshoot reduction value to the normal operation value after an overshoot of the output voltage is greater than or equal to a duration of the overshoot of the output voltage in response to turning on the switch.

12. A switching power converter comprising:
an input for receiving an input voltage from a power source;
an output for providing an output voltage to a load;
at least one switch capable of causing a voltage overshoot of the output voltage when the switch is turned on; and
a controller coupled to the at least one switch, the controller configured to sense the output voltage, compare the sensed output voltage to a voltage reference, and adjust operation of the power converter based on the comparison of the sensed output voltage and the voltage reference to maintain the output voltage at a target value, the controller further configured to temporarily change the voltage reference prior to triggering an expected overshoot or an expected undershoot of the output voltage to prevent the expected undershoot or overshoot from exceeding a specified overshoot threshold or a specified undershoot threshold.

13. The power converter of claim 12, wherein temporarily changing the voltage reference includes decreasing the voltage reference prior to triggering an expected overshoot of the output voltage.

14. The power converter of claim 12, wherein temporarily changing the voltage reference includes increasing the voltage reference prior to triggering an expected undershoot of the output voltage.

15. The power converter of claim 12, wherein the specified overshoot threshold is about 105 percent of the target value and the specified undershoot threshold is about 95 percent of the target value.

16. A method of controlling a switching power converter, the power converter including an input for receiving an input voltage from a power source, an output for providing an output voltage to a load, and a controller for controlling the output voltage of the power converter, the method comprising:
sensing the output voltage of the power converter;
comparing the sensed output voltage to a voltage reference;
maintaining the output voltage at a target value based on the comparison of the sensed output voltage and the voltage reference; and
changing the voltage reference prior to triggering an expected overshoot or an expected undershoot of the output voltage to prevent the expected undershoot or overshoot from exceeding a specified overshoot threshold or a specified undershoot threshold.

17. The method of claim 16, further comprising restoring the voltage reference to an original value of the voltage reference, after the expected overshoot or the expected undershoot of the output voltage.

18. The method of claim 17, wherein changing the voltage reference includes decreasing the voltage reference prior to turning on a switch.

19. The method of claim 16, wherein changing the voltage reference includes decreasing the voltage reference prior to triggering an expected overshoot of the output voltage.

20. The method of claim 16, wherein changing the voltage reference includes increasing the voltage reference prior to triggering an expected undershoot of the output voltage.

* * * * *